United States Patent Office 2,908,727
Patented Oct. 13, 1959

2,908,727

REACTION OF DIAZO COMPOUNDS

Irving L. Mador, Cincinnati, Ohio, assignor to National Distillers and Chemical Corporation, New York, N.Y., a corporation of Virginia No Drawing. Application April 12, 1957
Serial No. 652,371

14 Claims. (Cl. 260—668)

The present invention relates to a process for preparation of diaryl derivatives of dimers of a diene, more particularly to preparation of diphenyl derivatives of dimers of butadiene.

The invention is based on the discovery that a conjugated diene can be subjected to reaction in the presence of free aryl radicals, liberated from an aryl diazonium salt under conditions whereby coupling of two units of the diene occurs along with addition of one aryl radical per diene unit of the coupled diene thereby producing a diaryl derivative of the dimer of the diene. Specifically illustrated by use of butadiene as the diene and a free phenyl radical liberated from an aryl diazonium salt, the process embodied herein results in production of a diaryl octadiene which, if desired, can be hydrogenated to the corresponding diaryloctane and which, in turn, can be subjected to reactions, such as by nitration and reduction, to form valuable difunctional derivatives such as diaminodiphenyl octane.

For providing the free aryl radicals, a suitable method embodies subjecting an aryl diazonium salt to a suitable oxidation-reduction reaction whereby a free aryl diazo radical is formed and which, due to being thermally unstable, decomposes into free nitrogen and a free aryl radical. A suitable method for production of such free aryl radicals involves the use of a water-soluble aryl diazonium salt for oxidation-reduction reaction with a suitable water-soluble reductant metal salt whereby a free aryl diazo radical is formed and which decomposes into nitrogen and a free aryl radical. More specifically, a suitable diazonium salt, such as benzene diazonium chloride is subjected to oxidation-reduction reaction with a water-soluble reductant metal salt such as titanous chloride, vanadous chloride, ferrous chloride, and the like, and, as is illustrated by use of a titanous salt, to form a free phenyl radical as follows:

$$C_6H_5N_2Cl + TiCl_3 \rightarrow C_6H_5N_2\cdot + TiCl_4$$
$$C_6H_5N_2\cdot \rightarrow C_6H_5\cdot + N_2$$

Although such a free radical-forming system is suitable for practice of this invention and has been utilized for illustrating specific embodiments, other methods that form such free radicals may be employed. Such other methods include electrolytic decomposition of benzene diazonium chloride, radiation induced decomposition of benzene diazonium chloride, and thermal decomposition of benzene diazonium hydroxide.

With reference to the aryl diazonium salt from which the free aryl radicals are derived, benzene diazonium chloride is particularly suitable but other diazonium salts, including perchlorates and acetates, and substituted aniline salts such as p-cyano diazonium chloride and p-nitro diazonium chloride, may be employed.

The process embodied herein may be carried out with use of a conjugated diene of which butadiene is particularly well adapted. However, the process may be carried out with use of other conjugated dienes, such as those containing from four to eight carbon atoms and specific examples of which include isoprene, dimethyl butadiene, pentadienes such as methyl 1,3-pentadienes, cyclopentadiene, and others.

The reaction between the free aryl radical and diene is carried out in an aqueous reaction medium containing an inert organic solvent that increases the mutual solubility of the diene reactant and aqueous components in the reaction mixture. For such a purpose, oxygen-containing organic solvents, inert in the described reaction, are particularly suitable with examples thereof being aliphatic alcohols such as ethanol, butanol, tertiary butanol, isopropanol and others, as well as other oxygen-containing organic substances such as dioxane, 2-methoxy ethanol, acetic acid, and the like.

In order to prevent hydrolysis of the reductant metal salt (e.g., titanous) and to increase the thermal stability of the diazonium salt, it is desirable to operate in a strongly acidic solution with a suitable range of acidities for the reaction medium being a normality up to about 10 N and preferably from 2 to 8 N based on the volume of water employed in the reaction.

Although it is not intended that the invention be bound by any theory as to the particular reactions that occur in producing diaryl dimers of a dimer as embodied herein, it is believed that the following reactions occur when, for illustrative purposes, the reactants include butadiene as the diene and a free phenyl radical is derived by initial reaction between titanous chloride and benzene diazonium chloride:

$$(C_6H_5)N_2Cl + TiCl_3 \longrightarrow (C_6H_5N_2)\cdot + TiCl_4$$

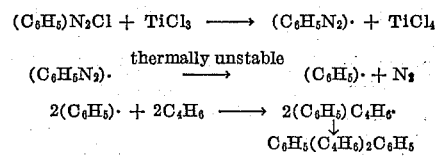

In order to illustrate the invention, but without intent of limitation, a specific embodiment is described hereinafter:

A solution was prepared comprising one-quarter mole of aniline in 62 ml. of concentrated HCl (¾ mole HCl) and 88 ml. of water. After cooling to 0° C., a solution of 17.3 g. of sodium nitrite (¼ mole) in 30 ml. of water was added slowly with stirring. The resulting diazotized solution was then added dropwise over a one hour period to a flask containing 200 ml. of isopropanol, the flask being fitted with a gas dispersator, stirrer, Dry Ice reflux condenser, and two dropping funnels.

Simultaneously, and at stoichiometrically equivalent rates, there was added to the flask ½ mole of butadiene and a solution containing ¼ mole of titanous chloride in 2 N aqueous hydrochloric acid in a total volume of 135 ml. During the additions over a one hour period, the temperature of the reaction mixture was maintained at 0° C. by means of an external cooling bath. During the reaction, evolution of a non-condensible gas ($N_2$) occurred.

200 ml. of diethyl ether were then added to the flask whereupon the vessel contents formed two liquid phases. The upper phase was removed and the ether and isopropanol was removed therefrom by distillation. The residual material was then dissolved in 100 ml. of benzene, dried with anhydrous magnesium sulfate, and the benzene removed by distillation, leaving a dark liquid weighing 20 grams (61% yield of theoretical as diphenyl octadiene).

Upon distillation of the dark liquid at reduced pressure (0.1 mm.), an intermediate fraction was obtained, in the range of 142–145° C., weighing 10.2 g. (31% yield). Infrared analysis of that material showed the presence of phenyl and olefin groups; a molecular weight of 268 was obtained as compared to 262 (calculated) for diphenyl octadiene and results of an elemental analysis were as follows:

|  | Percent | |
| --- | --- | --- |
|  | C | H |
| Found | 91.53 | 8.56 |
| Calculated for $C_{20}H_{22}$ | 91.55 | 8.45 |

In carrying out the reaction embodied herein, the diene reactant is preferably employed in excess so as to favor the dimerization thereof and formation of the desired diaryl derivatives of the diene dimer. On the other hand, less than a substantial excess of the diene may be used in which case, it is preferable, for minimization of undesired side reactions, to slowly add the free radical precursor and carry out the reaction at a relatively low rate of conversion of the diene. The maximum temperature employed is generally limited by the boiling point of the diene reactant although it is contemplated that carrying out the reaction under pressure is not precluded and in which a temperature above the normal boiling point of the diene may be used. Hence, and although a temperature of about 0° C. was used for the aforedescribed embodiment, lower temperatures may be used although temperatures sufficiently low so as to induce freezing of the aqueous components of the reaction mixture should be avoided.

In the production of diaryl derivatives of a diene dimer as embodied herein, the reaction may be carried out using a ratio of equivalents of two of the diene, one of the diazo compound and one of the reductant (e.g., titanous chloride). However, the invention is not limited thereto as it may be carried out with use of somewhat different proportional amounts of reactants and, for example, the diene may be used in amounts less than or greater than in the aforesaid ratio.

Diphenyloctane may be nitrated to the dinitro compound which is then reduced to the diamine which is of value in the formation of new polyamides, and as an intermediate in the synthesis of other derivatives. Similarly, products obtained through nitro aniline or cyano aniline as aforediscussed are useful in preparing new polymers such as polyamides, polyesters and polyurethanes.

While there are above disclosed but a limited number of embodiments of the process of the invention herein presented, it is possible to produce still other embodiments without departing from the inventive concept herein disclosed, and it is desired therefore that only such limitations be imposed on the appended claims as are stated therein.

What is claimed is:

1. A process for preparation of diaryl dimers of a conjugated diene which comprises reacting a conjugated diene with free aryl radicals liberated from an aryl diazonium compound whereby the diene dimerizes and one free aryl radical adds to each unit of the diene in the dimer to produce a diaryl derivative of the dimer of said diene.

2. A process, as defined in claim 1, wherein the free aryl radicals are liberated by subjecting an aryl diazonium salt to oxidation-reduction reaction with a reductant metal salt to form a free aryl diazo radical which decomposes into free nitrogen and a free aryl radical.

3. A process, as defined in claim 2, wherein the free aryl radicals are formed by subjecting a water-soluble aryl diazonium salt to oxidation-reduction reaction with a water-soluble reductant metal salt.

4. A process, as defined in claim 3, wherein the aryl diazonium salt is benzene diazonium chloride and the reductant metal salt is titanous chloride.

5. A process for preparation of diaryl dimers of a conjugated diene which comprises reacting a conjugated diene with free aryl radicals, liberated from an aryl diazonium compound, in an aqueous reaction medium in presence of an inert organic liquid that increases the mutual solubility of said diene and aqueous components in the reaction mixture whereby the diene is dimerized and one free aryl radical adds to each unit of the diene in the dimer to produce the diaryl dimer of said diene.

6. A process, as defined in claim 5, wherein the inert liquid is an oxygen-containing organic compound.

7. A process, as defined in claim 5, wherein the inert liquid is an aliphatic alcohol.

8. A process, as defined in claim 5, wherein the reaction medium is acidic.

9. A process for preparation of diphenyl dimers of an aliphatic conjugated diene which comprises subjecting an aliphatic conjugated diene to reaction with free phenyl radicals, liberated from a benzene diazonium compound, in an aqueous reaction medium in presence of an inert organic liquid that increases the mutual solubility of said diene and aqueous components in the reaction mixture whereby the diene is dimerized and one free phenyl radical adds to each unit of the diene in the dimer to produce the diphenyl dimer of said diene.

10. A process, as defined in claim 9, wherein the aliphatic conjugated diene contains four to eight carbon atoms.

11. A process for preparation of a diphenyl octadiene which comprises reacting butadiene with free phenyl radicals liberated from a benzene diazonium salt in an aqueous medium containing an inert liquid that increases the mutual solubility of butadiene and aqueous components in the reaction mixture.

12. A process, as defined in claim 11, wherein the diazonium salt is benzene diazonium chloride, and the inert liquid is an aliphatic alcohol.

13. A process for preparation of diphenyloctadiene which comprises providing an aqueous reaction mixture comprising benzene diazonium chloride and isopropanol and adding to said mixture butadiene and titanous chloride while maintaining the reaction mixture in liquid phase to produce diphenyloctadiene.

14. A process, as defined in claim 13, in which the reactants are employed in substantially a ratio of two equivalents of butadiene to one equivalent of benzene diazonium chloride to one equivalent of titanous chloride.

References Cited in the file of this patent

UNITED STATES PATENTS 2,757,192    Jenner _____ July 31, 1956

OTHER REFERENCES

Koelsch: Jour. Amer. Chem. Soc., vol. 65, 1943, pp. 57–58.

Koelsch: Jour. Amer. Chem. Soc., vol. 66, 1944, pp. 412–415.